June 19, 1956    F. B. HILL, JR., ET AL    2,751,419
PROCESS FOR PURIFICATION OF POLYTETRAMETHYLENEETHER
Filed Sept. 13, 1954
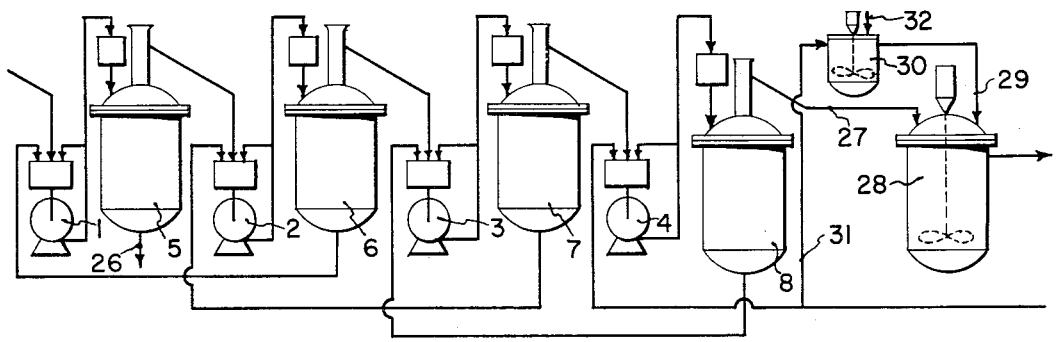
Fig. 1
Fig. 2
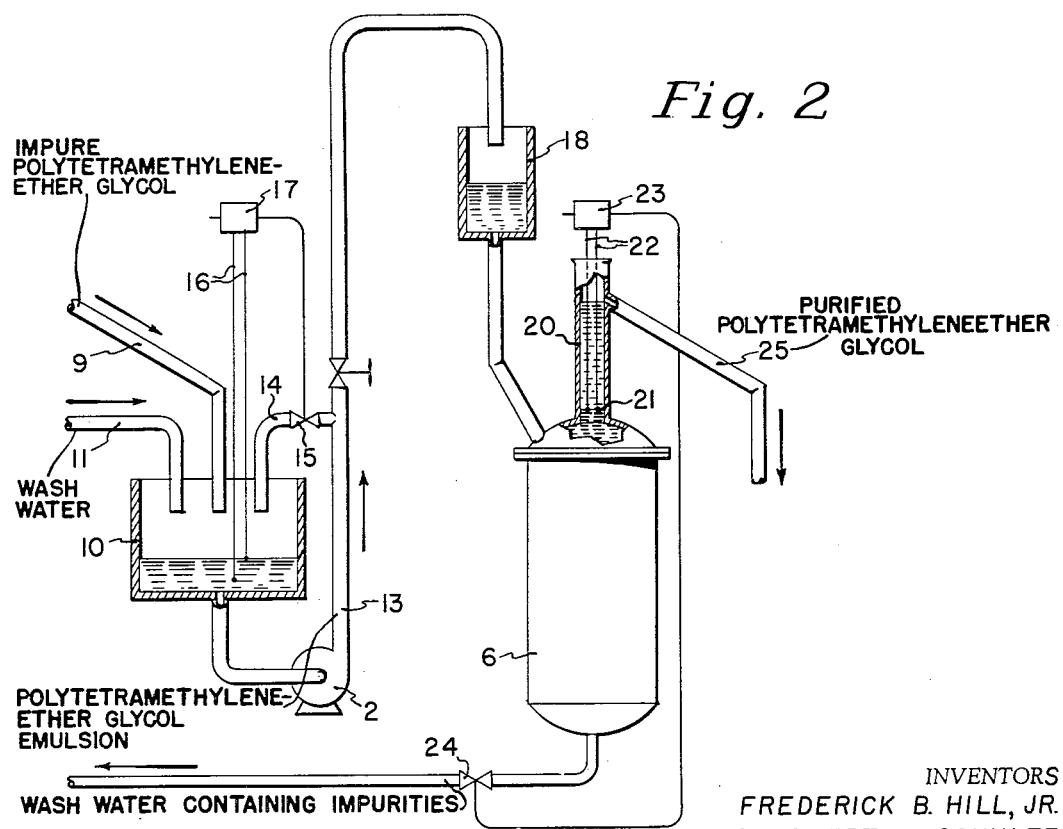
INVENTORS
FREDERICK B. HILL, JR.
& ROBERT A. SCHULZE
BY *Cullen D. Frey*
ATTORNEY United States Patent Office 2,751,419
Patented June 19, 1956

2,751,419

PROCESS FOR PURIFICATION OF POLYTETRAMETHYLENEETHER

Frederick B. Hill, Jr., New Castle, and Robert A. Schulze, Wilmington, Del., assignors to E. I. du Pont de Nemours & Company, Wilmington, Del., a corporation of Delaware Application September 13, 1954, Serial No. 455,732

4 Claims. (Cl. 260—615)

This invention relates to chemical process, and more particularly to a process for preparing polytetramethyleneether glycol of relatively high purity having a molecular weight of from 750 to 4000.

Polytetramethyleneether glycol having a molecular weight of from 750 to 4000 has been found to be a valuable intermediate for the manufacture of elastomers, and, while the preparation of this polymer has been described in reports received from Germany (see PB 717 and PB 22697), no detailed chemical or physical characteristics have been given except as to the degree of polymerization. We have found that polytetramethyleneether glycol prepared by the prior art processes is not of sufficient purity or uniformity in its chemical constitution to give a high grade elastomer of uniform properties, and that to give such an elastomer the polytetramethyleneether glycol must be of relatively high purity. It was therefore necessary to devise a process that would give a uniform product of high purity, and one which could be readily operated on a commercial scale.

It is therefore an object of the present invention to provide a simple and economical process for the preparation of polytetramethyleneether glycol having a molecular weight of from 750 to 4000 and of consistently high purity. It is a further object of the invention to provide an efficient continuous process for the commercial preparation of polytetramethyleneether glycol. It is a more specific object of the invention to provide an efficient method of washing the excess acid from polytetramethyleneether glycol and finally neutralizing any acid remaining therein, wherein impurities are removed and a relatively pure product obtained.

We have found that polytetramethyleneether glycols of a molecular weight of 750 to 4000 of relatively high purity, which can be employed in the preparation of elastomers of uniform grade, can be prepared by subjecting the crude polytetramethyleneether glycol, which is obtained after polymerizing tetrahydrofuran and hydrolyzing any resultant esters in the polymer and removing the unpolymerized tetrahydrofuran by distillation, to a countercurrent washing with water, preferably in from 3 to 6 stages, and subsequently neutralizing any remaining acidic material that may be present with an aqueous slurry of calcium hydroxide. The product may be further purified and decolorized by adding activated carbon, after which it is filtered and dried, preferably under vacuum in the later stages of the drying process.

In the accompanying drawing which forms a part of this application, Figure 1 is a diagrammatic flow diagram illustrating a series of apparatus in which the present invention may be carried out, and Figure 2 is an enlarged detail of one of the washing units.

The polytetramethyleneether glycol obtained by this process having a molecular weight of 750 to 4000 contains less than 0.01% carbonyl groups, less than 0.01% peroxide constituents, less than 0.05% moisture, and has an acid number of less than 0.1 and a total ash content of less than 0.005%. This product has been found to give elastomers of uniform properties, whereas a product having a higher acid number or containing even small quantities of metals such as copper and iron, is not satisfactory.

It has been disclosed in the prior art that the molecular weight of the polytetramethyleneether glycol resulting from the polymerization of tetrahydrofuran with a catalyst can be controlled by varying the ratios of tetrahydrofuran to the catalyst. High ratios of tetrahydrofuran to catalysts give high molecular weights, while low ratios give lower molecular weights. The temperature of the polymerization also governs the rate of polymerization and the equilibrium conversion. Ratios of tetrahydrofuran to the catalyst employed may vary from 100:4 to 100:20, while the temperatures of from 20° to 50° C. have been found satisfactory to give good conversion in from two to ten hours. At temperatures substantially below 20° C. the rate of conversion is reduced below that which is practicable for commercial production. At a given temperature and ratio of tetrahydrofuran to catalyst, the molecular weight of the resultant polytetramethyleneether glycol first increases rapidly to a maximum and then falls off gradually to an essentially constant value. The polymerization may be stopped at any arbitrary point to recover a polytetramethyleneether glycol of a desired molecular weight. Shorter times or higher ratios of tetrahydrofuran to catalyst will give higher molecular weights, and it is thus possible within the range of normal operating conditions to obtain polytetramethyleneether glycols of molecular weights of from 750 to 4000 with maximum conversion of the tetrahydrofuran of about 65%.

When using an acid catalyst such as a fluosulfonic acid, the polymer is converted, at least in part, to esters, and it is necessary that these esters be hydrolyzed if maximum yields are to be obtained. Since the viscosity of the polymeric glycol may be quite high, the hydrolysis is accomplished by drowning the mass in hot water under vigorous agitation or it can be accomplished by a continuous cocurrent drowning in a turbannular flow tube using steam as the propelling force. Ordinarily the amount of steam and water employed should be at least half of the weight of the polymer and up to equal weight of water may be used if a more dilute glycol mass is desired.

The unreacted tetrahydrofuran is removed from this aqueous dispersion by steam stripping in a conventional stripping column, using a temperature of about 100° C. at the bottom of the column to somewhat over 65° C. at the top. In distilling off the excess tetrahydrofuran, it is desirable to add an antioxidant to the aqueous dispersion of the polymer during the distillation to inhibit the formation of peroxides and carbonyl groups in the polymer. Usually from 0.10% to 1% of antioxidant, such as phenyl-beta-naphthylamine, may be employed.

In the polymerization step, catalysts such as fluosulfonic acid, chlorosulfonic acid, pyrosulfuric acid, ferric chloride, aluminum chloride, tin tetrachloride, or other types of acidic catalysts may be used. A large list of such catalysts have been described in the PB reports above mentioned. Other antioxidants such as diphenyl-p-phenylene diamine, phenyl-alpha-naphthylamine, di-beta-naphthyl-p-phenylene diamine, di-tert-butyl-p-cresol, 2,5-di-tertiary-butyl hydroquinone, 2,2'-methylene bis(6-tertiary-butyl-p-cresol), 6,6'-methylene di-2,4-xylenol or similar antioxidants may be used.

The polytetramethyleneether glycol as it comes from the stripping column may be separated as an upper layer with a lower aqueous acid layer being formed. The polymer layer still contains some water and acidic products such as HF and $H_2SO_4$, the greater portion of which can be washed from the polymer by the agitation with water. By the usual methods, however, an appreciable quantity of the polytetramethyleneether glycol is emulsified in the aqueous phase during the washing step and separates from the water only very slowly. On repeated washing of the glycol layer it has been found that as it becomes more nearly neutral the more it tends to emulsify in the water phase from which it separates very slowly. We have found that this almost unsurmountable difficulty can be overcome by passing the polymerization mass from one washing stage to the next and passing water in the opposite direction, using the separated aqueous phase of one stage for washing the next more acidic polytetramethyleneether glycol. Thus the least acidic stage of polytetramethyleneether glycol is washed with fresh water and the most acidic stage is washed with water which has passed through the other stages. The separation into layers at the most acidic stage, that is, directly out of the stripper, is quite clean and rapid. Thus, in net effect all the wash water is separated at the first stage where it is contacted with the hydrolysis mass from the stripper. The ratio of the water to polytetramethyleneether glycol may vary from 1:1 to 10:1.

After a reasonable amount of washing of the polytetramethyleneether glycol, there is still some residual acidity which is detrimental in the use of this product for the preparation of elastomers. We have found that this can be readily removed by stirring the polymer with an aqueous slurry of calcium hydroxide, using from about 0.25 to 5.0 parts (preferably 1 part) of calcium hydroxide to 100 parts of the polytetramethyleneether glycol. It has been found that a slurry is necessary to provide rapid neutralization, for a solution requires ten to twenty times as long as a slurry to effect complete neutralization. The aqueous slurry of the calcium hydroxide to be added should contain from 5% to 15% of calcium hydroxide to keep the load on the drying apparatus at a minimum and to prevent an unduly large amount of the polymer being held in the calcium hydroxide filter cake which results on filtering the polymer slurry. It has been found that the slurry of calcium hydroxide is much more effective in neutralizing the acid present in the viscous polymer mass than even much more concentrated solutions of soluble alkalies such as caustic soda. Apparently the efficiency of the calcium hydroxide is due to the solid calcium hydroxide particles in the suspension breaking down the emulsion much more rapidly than is accomplished with an aqueous solution of an alkali.

The washing of the acid from the polytetramethyleneether glycol and subsequent neutralization are readily carried out in a continuous process. The filtration can be carried out in the usual line type filters, using two or more units in parallel, one or more being used while others are being cleaned. The residual water is readily removed from the neutralized polytetramethyleneether glycol, preferably by carrying out the preparation in two stages, the first step at atmospheric pressure while the second step is preferably carried out under a vacuum, usually at less than 50 mm. of mercury. Vacuum may also be employed in the first step, if found desirable. Any convenient evaporation equipment may be used, such as the simple still, a falling film evaporator, a calandria, etc. By this process the residual moisture in the polytetramethyleneether glycol can be reduced to less than 0.05% by weight. This is particularly desirable where the polymer is to be employed with isocyanates in the preparation of elastomers or other polymeric materials.

After the drying step, any colored impurities may be removed by the use of from 0.1% to 1.0% of an activated carbon such as hydrophobic wood chars, sulfite liquor chars, etc., commercially available, such as "Darco KB," "Nuchar CN," "Nuchar CA," "Suchar," etc., or if desired it may be decolorized before drying with activated carbons such as "Pittsburgh RB" or "Darco S–51," etc.

By this process the quantities of peroxide or carbonyl groups in the resulting polytetramethyleneether glycol are reduced substantially to zero, thus giving a product that is uniform in chemical constitution and containing no detrimental groups or impurities. It is essential that metals such as copper and iron be removed, which is accomplished by the process as above described. The washing and neutralization as above described are particularly adapted for use in a continuous process, since the countercurrent washing has been found to be not only more economical than the batch process, but unexpectedly gives appreciably higher yields.

The following example of a continuous process involving the steps constituting the present invention is given to illustrate in more detail how the process is carried out, it being understood that various modifications may be made in the process without departing from the spirit of the invention or the scope of the appended claims.

The crude polytetramethyleneether glycol used in this process was prepared by polymerizing tetrahydrofuran in a continuous polymerizer composed of three vessels, through which a mixture of the tetrahydrofuran and fluosulfonic acid were passed under mild agitation while the temperature was maintained at between 20° and 50° C. Depending upon the molecular weight of the polymer desired, the amount of tetrahydrofuran to fluosulfonic acid can vary in ratio from 9:1 to 17:1. The rate at which the reactants were passed through the continuous polymerization varied from 3 to 4 hours, depending upon the polymer desired.

Since the conversion of the tetrahydrofuran to the polytetramethyleneether glycol was approximately 65%, unreacted tetrahydrofuran was stripped from the mass and recycled. The stripping was carried out through a cocurrent turbannular flow tube such as that described more particularly in U. S. Patent 2,467,769 to Morrow and Parsons, in which the viscous polytetramethyleneether glycol was effectively emulsified by the addition of water and steam. This viscous polymerization mass was completely broken up into a fine dispersion and, together with approximately 0.3% of phenyl-beta-naphthylamine as an aqueous solution, fed into the top of a stripping column. The column was operated at a bottom temperature of about 103° C. with a top temperature of about 84° C. From the bottom of the stripping column the crude polytetramethyleneether glycol containing about 48 pounds of aqueous acid per 30 pounds of polytetramethyleneether glycol was then washed according to the present invention as follows:

*Example*

The partially emulsified polytetramethyleneether glycol water effluent from the stripping column is subjected to a countercurrent washing operation in an apparatus more particularly illustrated in the accompanying drawing, in four stages. Each stage consists of an agitating phase which is carried out in pumps 1, 2, 3 and 4, and a settling stage which is carried out in vessels 5, 6, 7 and 8. The pumps employed may be any of the usual types of centrifugal pumps or a gear pump, to effect thorough contact of the polytetramethyleneether glycol with the wash water.

In operation, 78 pounds per hour of effluent from the stripping column are fed through line 9 into a gravity feed tank 10 together with wash water through line 11 from the next settling vessel. The line 13 from the pump in each instance is provided with a bypass 14 and a solenoid valve 15 which permits circulation of the polytetramethyleneether glycol emulsion through the pump and gravity feed tank 10 to maintain a substantially constant level in the feed tank through an electrical conductivity probe 16 through an electrical relay 17 which activates the solenoid valve 15 in the bypass from the pump.

The thoroughly agitated emulsion from pump 1 is then fed through line 13 into a gravity flow tank 18 from which the emulsion runs into the settling vessels which, for the rate of flow given above, should be of approximately a 12 gallon capacity. Here the emulsion is allowed to stratify the upper polytetramethyleneether glycol layer rising in column 20 wherein the interface at 21 is maintained at a substantially constant level by an electrical conductivity probe 22 which through an electrical relay 23 operates an outlet solenoid valve 24 through which the aqueous layer is drawn off at the bottom of the settling vessel. The upper polytetramethyleneether glycol layer from the first vessel flows by gravity through the pipe 25 to the gravity feed tank 10 of the next phase while the wash water for each phase is drawn from the bottom of the settling vessel of the successive phase and is again emulsified by vigorous agitation in the pump as described in detail for the first phase. The flows are thus continued, the polytetramethyleneether glycol advancing from the first to the fourth separator while the aqueous phase flows from the fourth through the third, second and to the first phase. The lower aqueous layer from the first phase is drained off through a lead 26 to the sewer while the polytetramethyleneether glycol from the last phase is drawn off through the lead 27 to the neutralizing tank 28 into which a calcium hydroxide suspension is introduced through line 29 from mixing tank 30, the water being fed in at 31 while the calcium hydroxide is introduced into the mixing tank at 32.

The acidity of the aqueous phase in the washing apparatus increases with each step. The hold-up time of the polytetramethyleneether glycol layer in each separator is approximately 15 minutes, while the hold-up time for the aqueous layer is approximately 1½ hours. The volume of the polytetramethyleneether glycol layer is therefore approximately 15% of the aqueous layer, which permits satisfactory separation of the polytetramethyleneether glycol from the aqueous solution containing acids and other impurities. The polytetramethyleneether glycol is decanted from the fourth separator at a rate of about 34 pounds per hour. It contains approximately 15% water and has an acid number of 7.

The neutralization is carried out by continuously adding to the neutralizer 28 approximately 4 pounds per hour of a calcium hydroxide aqueous slurry, based on the 34 pounds per hour effluent from the last washing phase. The temperature in the neutralizing tank is held at approximately 80° C.

The neutralized polytetramethyleneether glycol is freed from moisture by passing it at the rate of approximately 38 pounds per hour first through a 10 gallon agitated jacketed vessel wherein the solution is maintained at about 105° C., then through a second 10 gallon vessel which is held under a vacuum of approximately 20 mm. pressure and the solution at a temperature of about 140° to 145° C.

The polytetramethyleneether glycol may be further decolorized and purified by continuously adding to the effluent from the evaporator under efficient agitation such as in an agitated vessel, approximately 0.3 pound per hour of an activated carbon ("Darco KB") as a 25% slurry in previously produced polytetramethyleneether glycol of the same molecular weight. From this vessel the product is pumped through a plate or frame filter having approximately 12 square feet of filter surface which is steam jacketed so that the solution can be kept hot during the filling operation.

In the process described in this example, polytetramethyleneether glycol having an average molecular weight of 1037 was obtained in the following purity:

| | |
|---|---|
| Hydroxyl number | 108 |
| Acid number | Nil |
| Carbonyl number | Nil |
| Peroxides percent | 0.0005 |
| Total ash | Nil |
| Water percent | 0.045 |

In another example where the polymerization was stopped when the average molecular weight of the polymer was 3035, the product submitted to the same procedure had a purity as follows:

| | |
|---|---|
| Hydroxyl number | 34 |
| Acid number | Nil |
| Carbonyl number | Nil |
| Peroxides | Nil |
| Total ash | Nil |
| Water percent | 0.04 |

We claim:
1. A process for purifying a crude polytetramethyleneether glycol obtained by catalytic polymerization of tetrahydrofuran and containing acidic material and other impurities, which comprises washing it in a plurality of stages in a countercurrent manner in which the wash water from the more purified stage is used to wash the more crude polytetramethyleneether glycol in the less purified stage, and thereafter neutralizing the residual acid in the washed polytetramethyleneether glycol with an aqueous slurry of calcium hydroxide.

2. The process of claim 1 in which the polytetramethyleneether glycol containing calcium hydroxide in suspension is decolorized with an activated charcoal, filtered and dried by distilling off residual water.

3. A process for purifying a crude polytetramethyleneether glycol obtained by catalytic polymerization of tetrahydrofuran and containing acidic material and other impurities, which comprises washing it in four stages in a countercurrent manner in which the wash water from the more purified stage is used to wash the more crude polytetramethyleneether glycol in the less purified stage, and thereafter neutralizing the residual acid in the washed polytetramethyleneether glycol with an aqueous slurry of calcium hydroxide.

4. A process for purifying a crude polytetramethyleneether glycol obtained by catalytic polymerization of tetrahydrofuran and containing acidic material and other impurities, which comprises washing it in a plurality of stages in a countercurrent manner in which the wash water from the more purified stage is used to wash the more crude polytetramethyleneether glycol in the less purified stage, and thereafter neutralizing the residual acid in the washed polytetramethyleneether glycol with a 5% to 15% aqueous slurry of calcium hydroxide sufficient to provide from 0.25 to 5.0 parts of calcium hydroxide to 100 parts of the polytetramethyleneether glycol.

References Cited in the file of this patent

UNITED STATES PATENTS

| | | |
|---|---|---|
| 1,704,246 | Halloran | Mar. 5, 1929 |
| 2,425,845 | Toussaint et al. | Aug. 19, 1947 |

FOREIGN PATENTS

| | | |
|---|---|---|
| 898,269 | France | July 3, 1944 |